United States Patent [19]

Ochs et al.

[11] Patent Number: 4,803,031
[45] Date of Patent: Feb. 7, 1989

[54] METHOD AND APPARATUS FOR MOLDING A CLOSURE CAP

[75] Inventors: Charles S. Ochs, Lancaster; Carl E. Koontz, Thornville, both of Ohio

[73] Assignee: Anchor Hocking Corporation, Lancaster, Ohio

[21] Appl. No.: 590,153

[22] Filed: Mar. 16, 1984

Related U.S. Application Data

[62] Division of Ser. No. 384,185, Jun. 3, 1982, abandoned.

[51] Int. Cl.$^4$ .................. B29C 45/16; B29D 1/00
[52] U.S. Cl. .................. 264/255; 425/120; 425/130; 425/809; 425/DIG. 5
[58] Field of Search ........... 264/255; 425/120, 809, 425/DIG. 5, 130

[56] References Cited

U.S. PATENT DOCUMENTS

| | | | |
|---|---|---|---|
| 1,916,692 | 7/1933 | Scribner | 425/809 |
| 3,031,722 | 5/1962 | Gits | 264/255 |
| 3,281,295 | 10/1966 | Capucio | 265/255 |
| 3,376,608 | 4/1968 | Wilcox | 425/120 |
| 4,004,868 | 1/1977 | Ohdate | 425/120 |
| 4,094,460 | 6/1978 | Scanga et al. | 229/43 |
| 4,114,775 | 9/1978 | Shinozaki | 215/324 |
| 4,269,802 | 5/1981 | Linne | 264/255 |
| 4,385,025 | 5/1983 | Salerno et al. | 264/255 |

FOREIGN PATENT DOCUMENTS

| | | | |
|---|---|---|---|
| 2397280 | 3/1979 | France | 264/255 |
| 45-34270 | 11/1970 | Japan | 425/809 |

Primary Examiner—James Lowe
Attorney, Agent, or Firm—Stoll, Wilkie, Previto & Hoffman

[57] ABSTRACT

An improved molded closure cap is described which has a softer sealing portion and a relatively hard closure engaging portion. The cap is molded using two differing plastics where the container engaging portion is molded of a softer seal-forming plastic and the remaining portion or shell is molded of a harder plastic. The novel molding apparatus and method employ plunger or die movement to facilitate a successive molding of the soft and hard cap portions without changing the molding plunger or die.

4 Claims, 2 Drawing Sheets

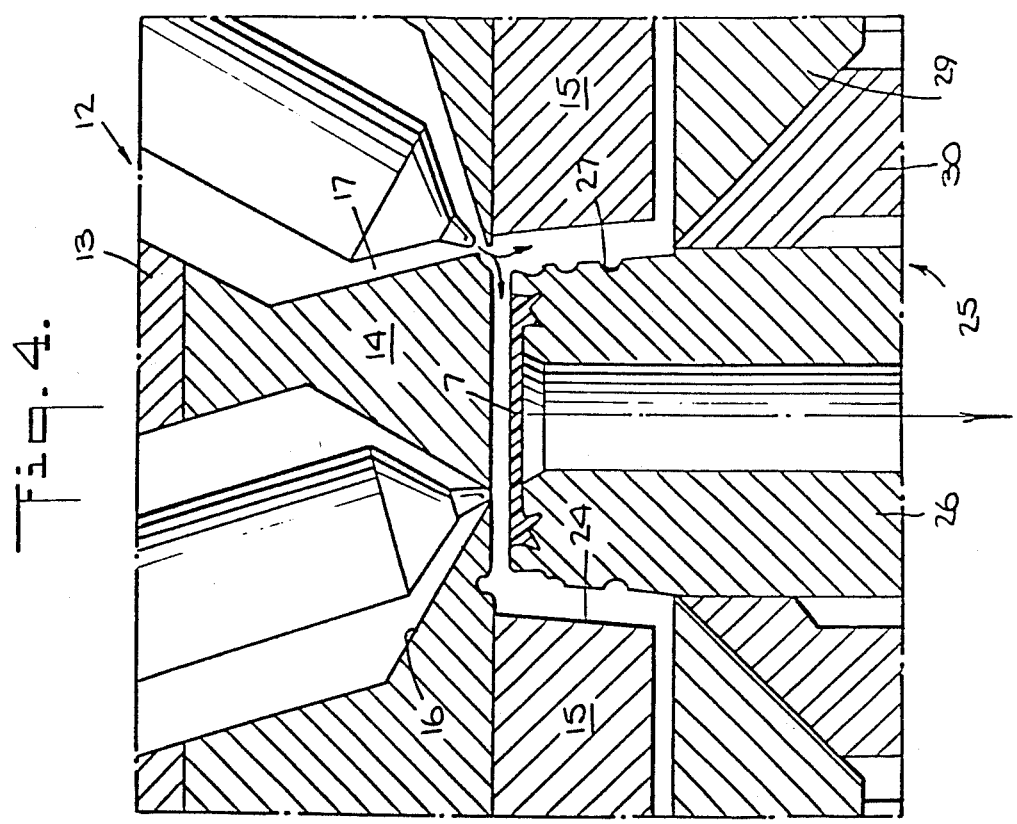
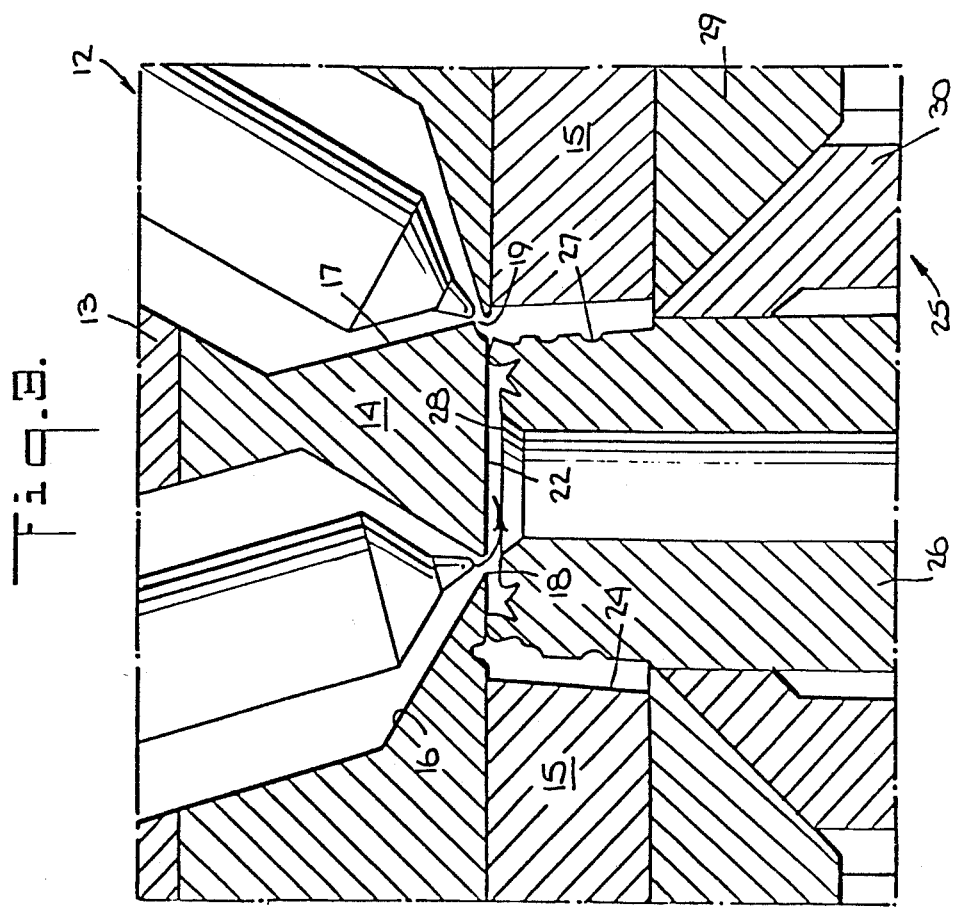

METHOD AND APPARATUS FOR MOLDING A CLOSURE CAP

This is a division of application Ser. No. 384,185 filed on June 3, 1982 now abandoned.

BACKGROUND OF THE INVENTION

The present invention relates to a molded closure cap for sealing a container and more particularly to a closure cap which is formed in a molding operation where portions of the cap are formed of one plastic and where other portions are formed of another plastic. The same molding dies or plungers are used with different nozzles for the two plastic materials.

There are a number of plastic closure caps which are presently formed by a molding operation where the container engaging threads and other portions are formed in a single mold. Most closure caps of this type are formed from one type of plastic material which is used for the complete closure. Other closure caps are made of two or more plastic materials and the different portions are formed by successively activated plungers or dies.

The closure cap of the present invention uses different plastic materials for the hard and softer portions of the cap such as softer plastic materials for the sealing portions of the closure cap. The invention, however, includes a molding method and means where a single mold is used but where the differing plastic materials are supplied to the single molding means through separate nozzles and during successive spacing motion of the molding dies or plunger.

Thus, the present invention includes improved closure molding means where differing plastics with differing characteristics are used in the molding operation without a change of the molding plunger or dies.

Accordingly, an object of the present invention is to provide an improved method and means for forming a closure cap having portions formed of plastic materials of differing characteristics and to the improved closure thus formed.

Another object of the present invention is to provide an improved method and means of molding.

Another object of the present invention is to provide an improved closure cap having portions formed of differing plastic materials and to the method and means of its manufacture.

Another object of the present invention is to provide a novel closure cap having container engaging portions and sealing portions formed of plastic of differing characteristics.

Other and further objects of the present invention will become apparent upon an understanding of the illustrative embodiments about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIGS. 3 and 4 are enlarged sectional views illustrating successive positions of the molding elements of the apparatus in performing the molding operation of the invention.

DESCRIPTION OF THE PREFERRED EMBODIMENT

Figure 1:
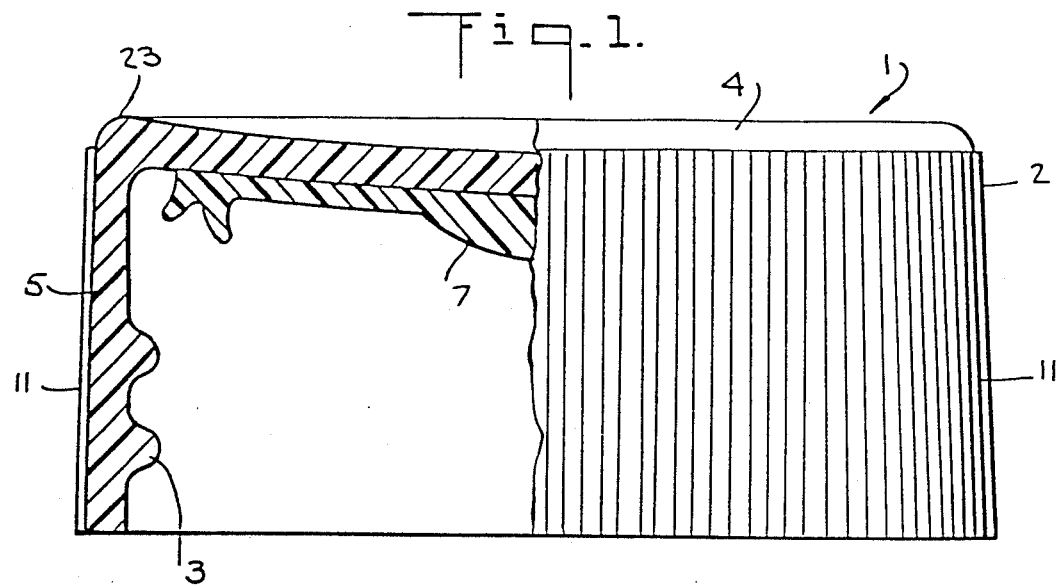
FIG. 1 is a front elevational view, partially cut away, of a closure cap in accordance with the present invention.
Figure 2:
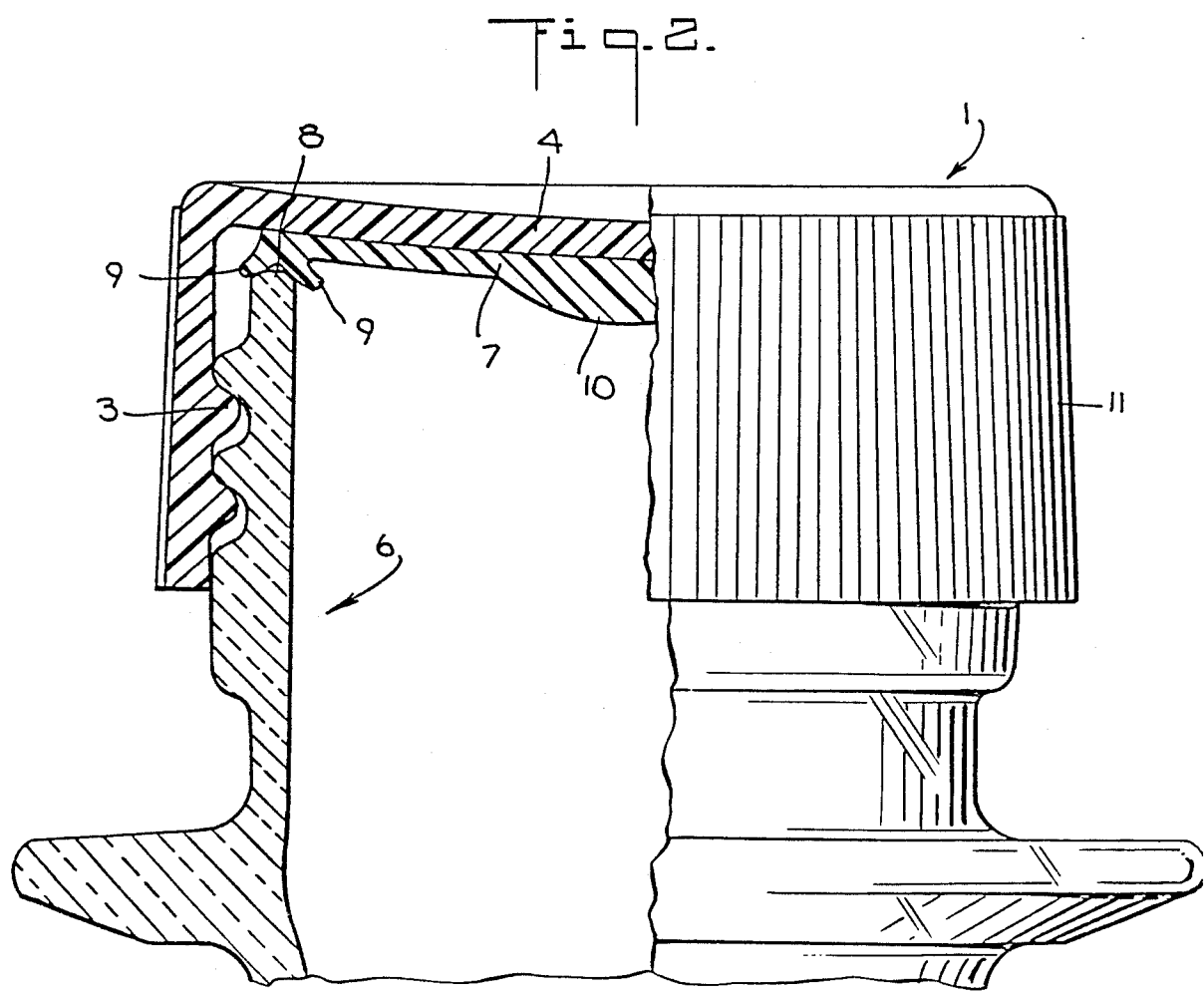
FIG. 2 is a front elevational view, partially cut away, of the closure cap of FIG. 1 in sealing engagement with a container.

FIGS. 1 and 2 illustrate a preferred embodiment of a molded closure cap 1 manufactured by the apparatus and method of the invention. The closure cap 1 has a molded outer shell 2 including container engaging means which are continuous threads 3 in the embodiment illustrated but which may be lugs or other suitable containing engaging members. The outer shell 2 is molded of a relatively rigid plastic such as polypropylene or copolymers thereof or high density polyethylene. These plastics are available in formulations which provide a relatively rigid and form retaining closure cap shell including the cover 4 and the dependent skirt 5 with the threads 3 formed on the inner surface of the skirt 5.

In order to provide for a tight seal with a glass or plastic container 6, including a seal which will contain pressure or provide a vacuum seal, an inner sealing member 7 is formed on the under surface of the closure cap cover 4 of a relatively softer plastic capable of conforming to and thereby creating a tight seal with the rim 8 of the container 6. The preferred cross section of the sealing member 7 includes container engaging members such as the flared ribs or fingers 9 positioned to engage the outer and inner corners of the container rim 8 finish. The central portion of the sealing member 7 may be reinforced, as illustrated, with a thickened center 10. In other embodiments this central thickening may take the form of a plug adopted to provide a stopper-like seal with the container mouth.

In the preferred embodiment of the closure 1 as illustrated, the closure cover 4 is shown with a concave shape. This shape of the cover is useful, particularly for pressure packages, where the internal pressure on the closure cap cover 4 tends to force it towards a flat shape rather than causing it to bulge outwardly. A number of plastic materials are useful for the sealing member 7 including low density polyethylene. The outer surface of the closure cap skirt 5 is knurled at 11 for facilitating the gripping of the closure cap 1 during application and removal.

FIGS. 3 and 4 illustrate a preferred apparatus for and method of molding closure caps of the general type described above. This preferred apparatus and method molds the closure cap including the harder outer shell and the softer inner plastic sealing member in successive injection operations within a unitary molding head with the two different plastics being injected through spaced injection nozzles in an upper die member and with controlled spacing operations for forming the separate portions being provided for by relative movement of portions of the molding apparatus.

The general method and the related apparatus will now be described generally with reference to FIGS. 3 and 4 which are enlarged cross sections of the molding apparatus.

There is an upper molding head 12 which is fixedly mounted. It includes a nozzle mounting portion 13 and cooperating members 14 and 15. Die member 14 includes a pair of nozzle mounting appertures 16 and 17 and nozzle outlets 18 and 19. The molding surface 28 of a plunger 26 is shaped to form a cavity in combination with the lower surface 22 of the member 14 to form the sealing member 7. The second die 15 fastened to the lower surface of the first die 14 includes an annular surface 24 defining the closure cap skirt 5. The lower molding head 25 is movable mounted and includes the central molding die or plunger member 26 with the thread molding surfaces 27 encircling its upper portion and with its top 28 being appropriately shaped to provide the desired lower surface on the sealing member 7.

The lower molding head 25 includes additional die members for sealing the underside of the cap skirt 5 for the molding operation including ring-like members 29 and 30.

The molding operation will now be described with particular reference to FIGS. 3 and 4 which show the positions of the molding members 12 and 25 during the successive injections of plastic through the two nozzle outlets 18 and 19.

Thus, FIG. 3 illustrates the lower molding head 25 in its raised position with a tight engagement between the plunger 26 and upper die member 14 in a position defining the sealing member 7. The softer plastic for the sealing member 7 is injected from nozzle outlet 18 into the sealing member cavity.

When this injection is finished, the entire lower die head 25 is lowered (FIG. 4) the exact distance which corresponds to the closure cap cover 4 thickness. The nozzle outlet 19 is used to fill the resulting cavity comprising the closure cap cover 4 and skirt portion 5. This cavity is defined by the upper die member 14, the top of the sealing member 7, the die member 15, plunger 26 and die member 29.

When these injections are completed, a finished closure cap 1 has been molded comprising the entire harder outer shell 2 and the softer inner sealing member 7. The lower molding plunger is now dropped a distance exceeding the closure cap 1 height and the molding plunger 26 is unscrewed from the closure 1 permitting the closure to be wiped clear.

Other sequences of relative motion may be used to open two successively communicating cavities to permit the injection of differing plastics without requiring a die change other than relative movement of die portions.

It will be seen that an improved method and means has been described for rapidly molding articles such as plastic closure caps and the like formed of two or more plastics of differing characteristics. A preferred closure cap formed of a plurality of plastic materials has also been described which is advantageously manufactured by means of the method and apparatus described.

As various changes may be made in the form, construction and arrangement of the invention and without departing from the spirit and scope of the invention, and without sacrificing any of its advantages, it is to be understood that all matter herein is to be interpreted as illustrative and not in a limiting sense.

Having thus described our invention, we claim:

1. A method for molding generally cup-shaped plastic closures of one plastic material with interior molded container plastic sealing members of a differing plastic comprising the steps of holding two cooperating molding heads with communicating cavities in one position for injecting a first plastic into a first cavity defining the sealing members only, injecting the first plastic into said first cavity, providing relative movement between the molding heads forming a second cavity communicating with the plastic injected into said first cavity and defining a cup-shaped closure shell and injecting second plastic into the second cavity.

2. Apparatus for molding cup-shaped plastic closures of two or more plastic materials with an interior molded plastic elastomeric sealing member of one plastic material and a closure shell of a harder outer plastic material comprising a pair of molding heads each including molding dies, means for holding the heads in one relative position with a first cavity defining the elastomeric sealing member only, a plastic injector nozzle for elastomeric material positioned to communicate with said first cavity, means for moving said molding heads apart to a second position with the molding dies forming a second cavity communicating with said first cavity and defining the cup-shaped closure shells only, and a second plastic injection nozzle positioned to communicate with said second cavity to form the closure shell with an attached sealing member.

3. The apparatus as claimed in claim 2 in which one of said molding heads comprises a plunger member and means for rotating and axially moving said plunger from said molding dies.

4. The apparatus as claimed in claim 2 in which both of said plastic injection nozzles are positioned in one of said molding heads which is fixedly positioned.

* * * * *